US011154941B2

(12) United States Patent
Farris et al.

(10) Patent No.: US 11,154,941 B2
(45) Date of Patent: Oct. 26, 2021

(54) METHOD AND APPARATUS FOR MILLING PEN BLANKS

(71) Applicant: Woodpeckers, LLC, Strongsville, OH (US)

(72) Inventors: Jeffery E. Farris, Medina, OH (US); Paul E. Turley, Amherst, OH (US)

(73) Assignee: Woodpeckers, LLC, Strongsville, OH (US)

(*) Notice: Subject to any disclaimer, the term of this patent is extended or adjusted under 35 U.S.C. 154(b) by 0 days.

(21) Appl. No.: 16/538,431

(22) Filed: Aug. 12, 2019

(65) Prior Publication Data

US 2021/0046560 A1 Feb. 18, 2021

(51) Int. Cl.
| B23D 77/14 | (2006.01) |
| B23C 5/10 | (2006.01) |
| B23C 3/00 | (2006.01) |
| B23B 5/16 | (2006.01) |

(52) U.S. Cl.
CPC ............. B23C 5/10 (2013.01); B23B 5/168 (2013.01); B23C 3/00 (2013.01); B23C 2224/00 (2013.01); B23C 2260/00 (2013.01)

(58) Field of Classification Search
CPC ....... B43K 15/00; B23B 27/007; B23B 51/08; B23D 2277/42; B23D 2277/68; B23D 77/14; B23C 2210/248; B23C 2210/70
See application file for complete search history.

(56) References Cited

U.S. PATENT DOCUMENTS

| 4,218,163 A * | 8/1980 | Druschel ............... B23B 27/007 |
| | | 408/196 |
| 4,315,706 A * | 2/1982 | Erkfritz ............... B23B 27/1611 |
| | | 407/101 |
| 5,180,260 A * | 1/1993 | Phillips, Sr. ............ B23B 5/167 |
| | | 408/203 |
| D477,515 S | 7/2003 | Winivis |

(Continued)

FOREIGN PATENT DOCUMENTS

| CN | 109396503 A | * | 3/2019 | |
| DE | 102006016290 | | 10/2007 | |
| DE | 102006016290 A1 | * | 10/2007 | ............. B23B 31/40 |

OTHER PUBLICATIONS

English translation of CN 109396503 A (Year: 2019).*
Woodcraft, www.woodcraft.com, Whiteside—Pen Mill Set, retrieved from the Internet on Nov. 28, 2018, 5 pages.

*Primary Examiner* — Alan Snyder
(74) *Attorney, Agent, or Firm* — Sand Sebolt & Wernow Co. LPA

(57) ABSTRACT

A pen milling device and a method for milling pen blanks therewith. The device has a body selectively engageable with a rotating apparatus. A replaceable cutter is engaged with the body such that a cutting edge thereof extends outwardly beyond the body's end surface. The cutter has multiple cutting edges and may be reoriented relative to the body if a presented cutting edge becomes dull or damaged. A reamer extending outwardly from the body includes at least one flute. As the device is rotated, the cutter removes material from a pen blank and the reamer removes dried adhesive from a bore of a pen tube secured within a hole defined in the pen blank The device removes all of the pen material extending between an end of the pen blank and an associated end of the pen tube.

17 Claims, 14 Drawing Sheets

(56) References Cited

U.S. PATENT DOCUMENTS

| | | |
|---|---|---|
| 7,402,040 B2 | 7/2008 | Turri |
| 7,451,534 B2 * | 11/2008 | Kress .................. B23D 77/003 |
| | | 29/50 |
| D600,809 S | 9/2009 | Peterson |
| D608,802 S | 1/2010 | Ibarra et al. |
| D741,484 S | 10/2015 | Cho |
| D774,868 S | 12/2016 | Ouyang |
| D786,646 S | 5/2017 | Ouyang |
| D814,537 S | 4/2018 | Wu |
| D877,218 S | 3/2020 | Wu |
| D886,170 S | 6/2020 | Dill et al. |
| 2010/0014929 A1 * | 1/2010 | Stojanovski .......... B23B 51/107 |
| | | 407/54 |
| 2012/0259336 A1 | 10/2012 | del Rio et al. |
| 2013/0121777 A1 | 5/2013 | Gey et al. |
| 2017/0028582 A1 * | 2/2017 | Campbell .............. B43K 5/005 |

* cited by examiner

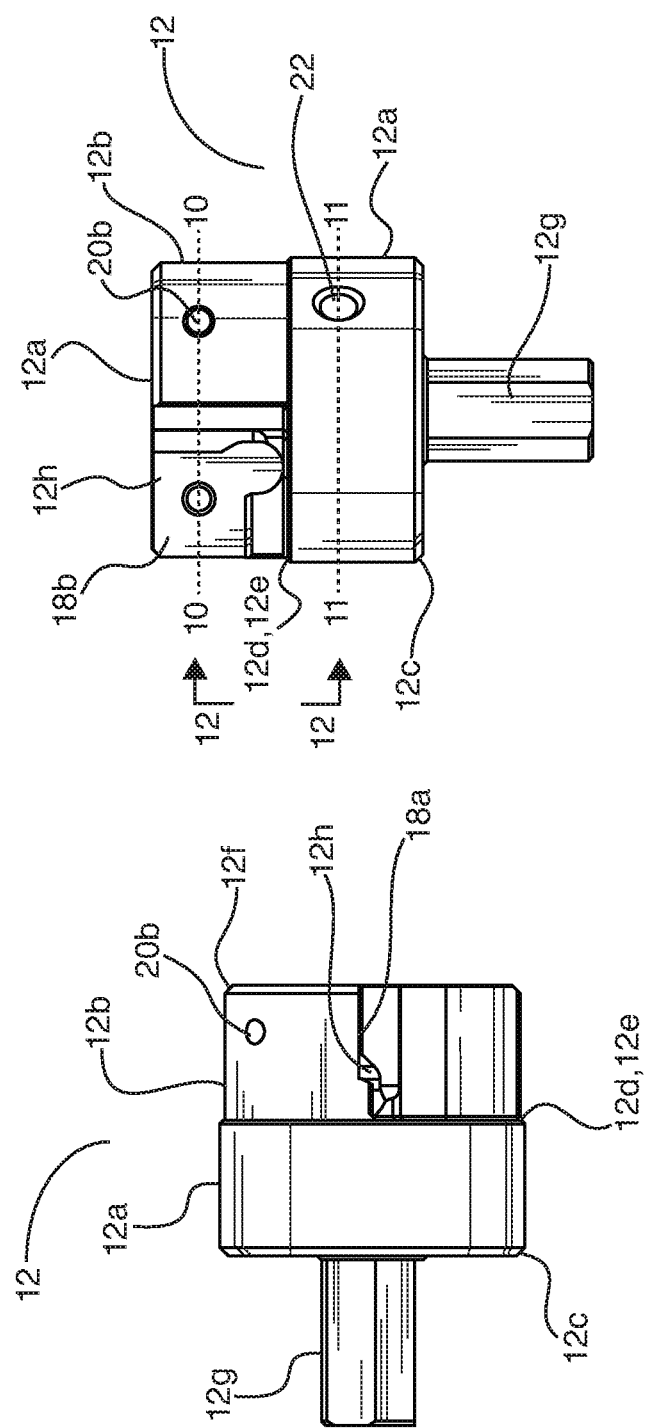

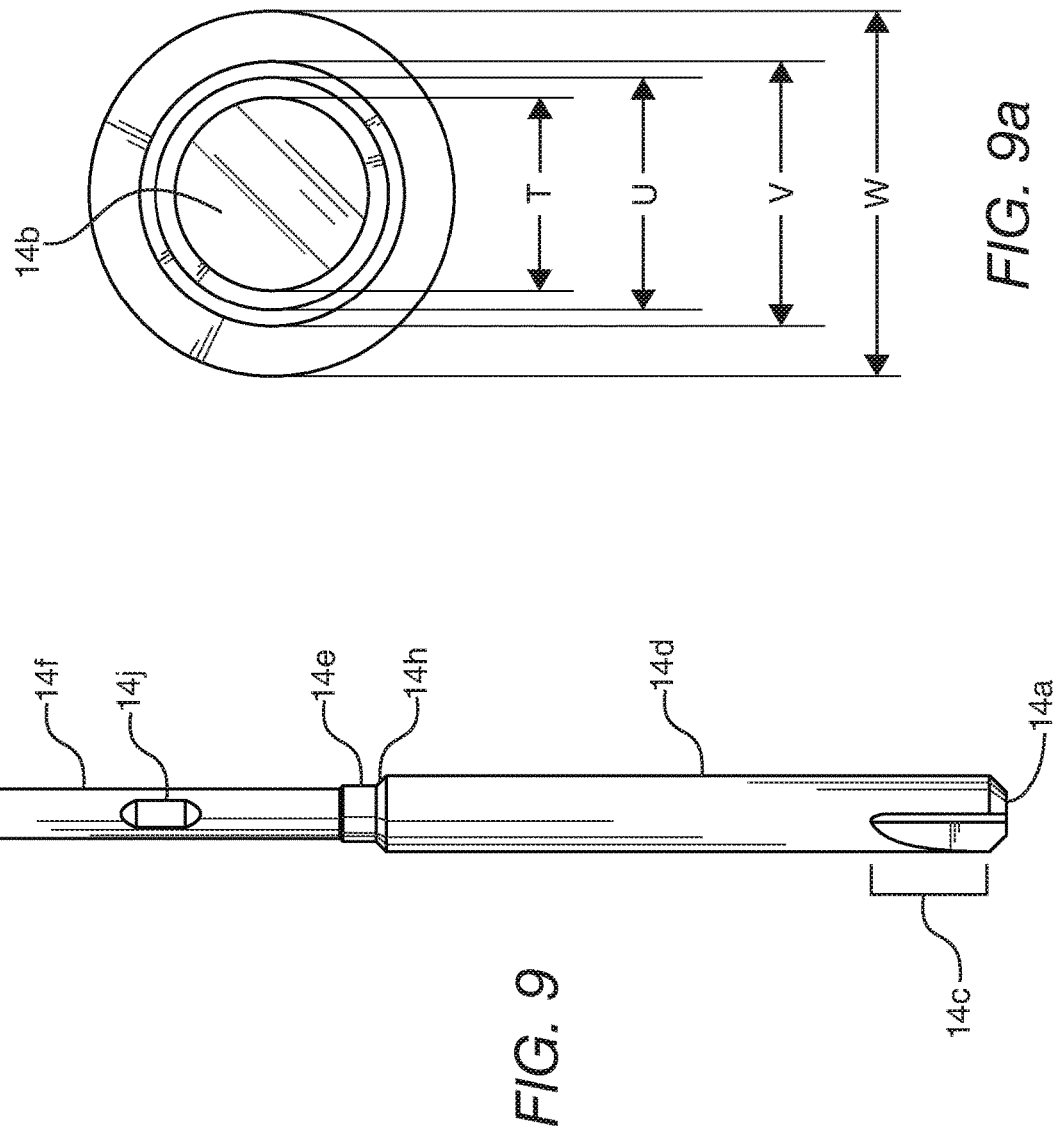

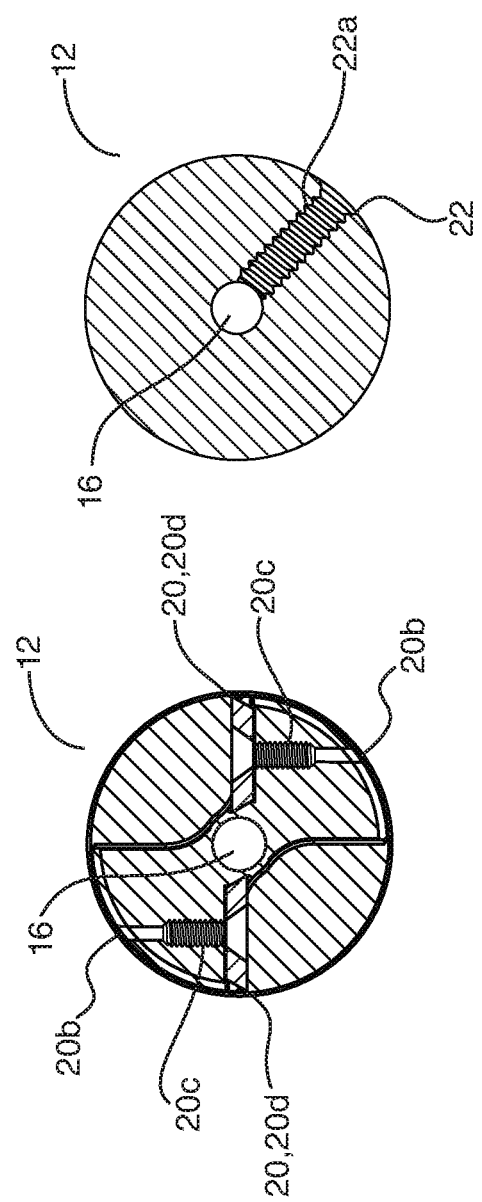

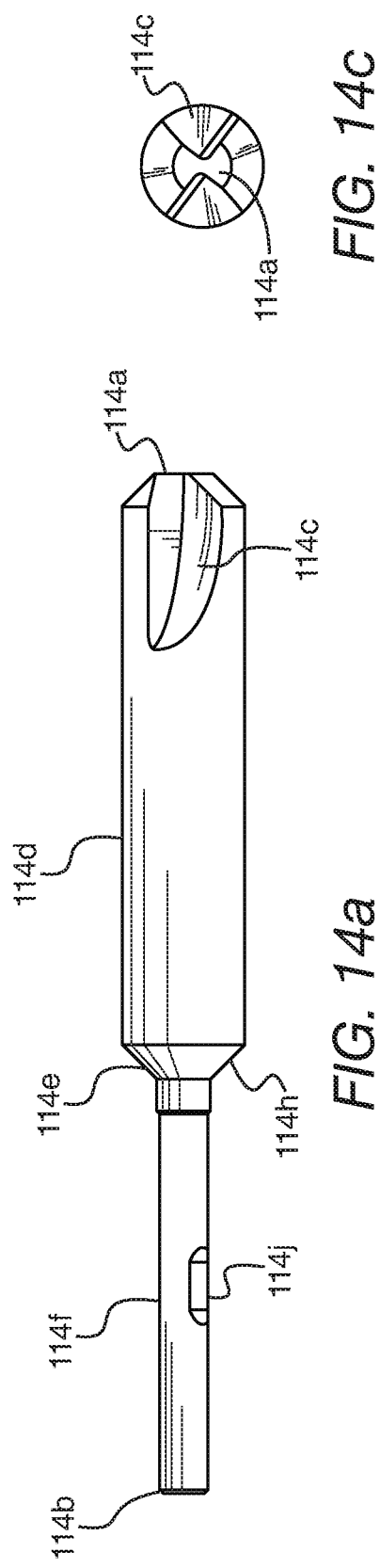
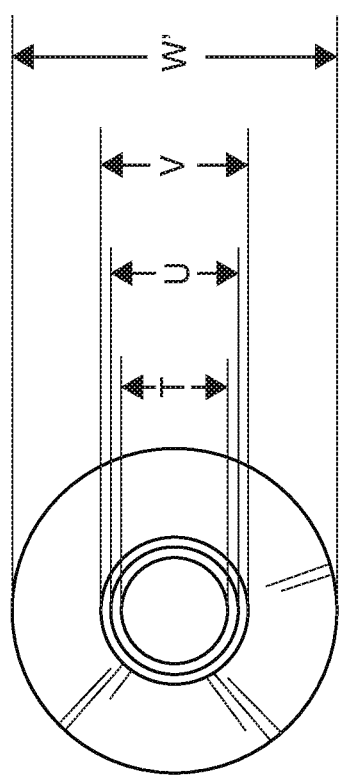
FIG. 14a
FIG. 14b
FIG. 14c

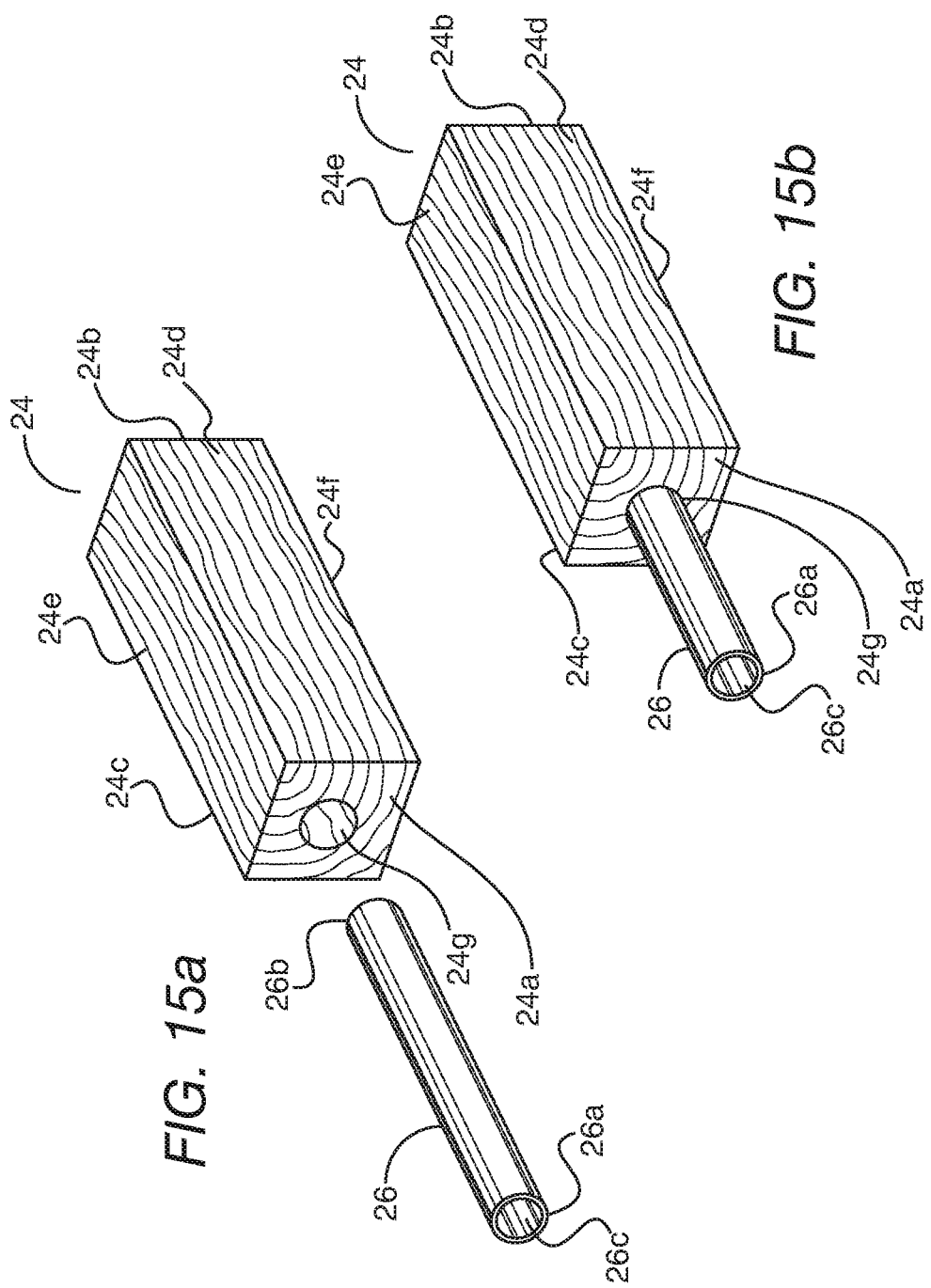

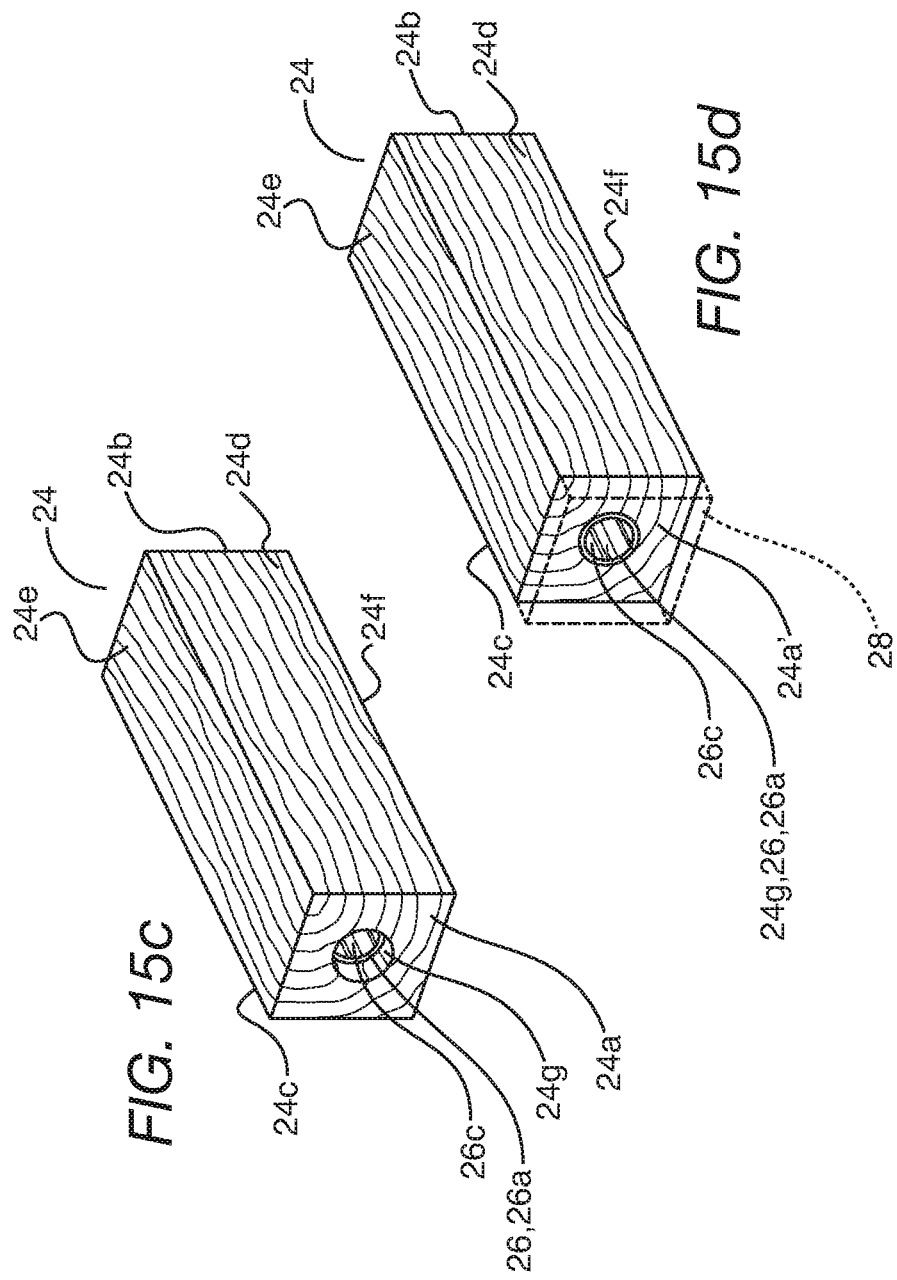

METHOD AND APPARATUS FOR MILLING PEN BLANKS

TECHNICAL FIELD

The present disclosure relates to a method and apparatus for milling pen blanks. Particularly, the disclosure is directed to a woodworking pen milling device comprising a cutter head and a reamer. Specifically, the disclosure relates to a pen milling device where the cutter head includes replaceable cutters arranged such that when the device is used, the cutters remove substantially an entire region of the pen blank between one end the pen blank and an end of a pen tube located within the pen blank.

BACKGROUND

Background Information

Woodworking has become a popular hobby and allows people to relieve stress and fulfill a unique and interesting expression of their creativity. A common place to start one's journey into woodworking is creating pens. The pens may be formed to have intricate and decorative housings which are machined or turned on a lathe. Generally, the housings are made of a wood or a non-wood material that will present an interesting visual exterior pattern for the pen owner when finished.

Pen blanks are typically rectangular cubes of wood or non-wood material that may be about ¾ inch in width and depth, and of a variable length. A craftsman will begin the transformation of the pen blank into a pen housing by drilling or boring a hole along a center axis of the cube of material. The craftsman will then select and insert a pen tube into the hole drilled in the pen blank. The term "pen tube" is used to describe a metal tube, typically made of brass, and utilized to hold a mechanism within the interior of the housing. In the case of a pen, the pen tube may hold components of a pen mechanism such as a spring mechanism, a clip device comprising a thrust device and thrust tube, and an inkwell. One or more of these components may be press-fittingly engaged with the pen tube. It will be understood that instead of the craftsman creating a housing for a pen from the pen blank, they may use substantially the same process to create a housing for an elongate tubular article such as a laser pointer, a mechanical pencil, and a whistle. The pen tube will then hold different appropriate mechanisms for these different articles.

Once the hole is drilled in the pen blank, glue is applied to an exterior surface of the pen tube and/or to the surface that defines the pen blank hole before the pen tube is inserted into the hole. Glue preferably is substantially evenly distributed along the length of the pen tube. Without proper glue distribution the pen tube may come loose over time. Because of this, it is not uncommon for craftsmen to apply too much glue to the pen tube or hole so as to be on the safe side and ensure proper pen tube to pen blank adhesion. Gluing a pen tube into a blank may be quite a messy process, particularly if too much glue is utilized. Excess glue may flow over the ends of the pen tube and into the pen tube's bore. The dried excess glue may become problematic for the craftsman down the road as it will prevent or hinder a pen mechanism from being engaged with the pen tube.

A standard pen tube is about seven millimeters in diameter but they may come in other diameters. Typically, the selected pen tube will be shorter in length than the length of the pen blank being utilized. Consequently, after the pen tube is installed into the pen blank, it is common to mill down the pen blank material until it is substantially of the same length as the pen tube.

Prior art tools used for milling pen blanks so that they are flush with the ends of the pen tube typically include a cutter head and a pilot shaft. The cutter head comprises a body with first and second ends and a bore that extends between the ends. The first end of cutter head that performs the milling is comprised of a series of peak-like cutting edges that are integrally formed with the cutter body and extend outwardly therefrom. The peak-like cutting edges may be arranged so that they extend radially outwardly away from the bore. These integrally formed cutting edges have to be regularly sharpened so that they are capable of cutting away material when the cutter head is rotated. The second end of the cutter head may be rounded or flat.

The pilot shafts of prior art milling tools have a first region that is inserted into an opening to the bore defined in the first end of the cutter head, extends through the bore, and out of an opening defined in the second end of the cutter head. A second region of these pilot shafts extends longitudinally outwardly away from the first end of cutter head and is sized to fit through a pen tube bore.

When the prior art cutter head is engaged with a drill press, the first region of the pilot shaft that extends outwardly beyond the second end of the cutter head is inserted into a collet of the drill press and is locked in place. The pen blank is clamped beneath the cutter head in such a way that as the drill press is lowered, the second region of the pilot shaft will enter the pen tube bore. The cutter head is rotated by the drill press and the cutting edges will remove material from the pen blank until the end of the pen blank is flush with the end of the pen tube.

One of the issues with prior art pen milling devices is that they tend to leave a full or partial ring or halo of pen blank material circumscribing the milled region. Additional time and energy may be needed to remove this ring or halo of material. Additionally, the second region of the pilot shaft may not adequately clean excess glue from the pen tube bore. This may require that the craftsman expend extra time and energy to remove this glue in order to engage the pen blank on a mandrel or to later install the pen mechanism.

Once the ends of the pen blank are substantially flush with the ends of the pen tube, a mandrel is passed through the pen tube bore and the pen blank is secured in place on a lathe. As the lathe rotates the pen blank about the blank's longitudinal axis, the craftsman will move a chisel or another cutting or scraping tool along the exterior surface of the rotating pen blank and will cut or shave wood from the blank and thereby form the cylindrical exterior shape of the pen housing.

SUMMARY

The pen milling device disclosed herein addresses the shortcomings of prior art milling devices in that it is capable of milling a pen blank flush with an end of a pen tube without leaving a halo of pen blank material behind and thereby saving a craftsman time and effort. Additionally, the pen milling device disclosed simultaneously removes any excess glue or adhesive from the pen tube bore as it includes a reamer as the pilot shaft. Furthermore, the pen milling device in accordance with the present disclosure has replaceable cutter heads each having multiple cutting edges. These cutter heads are simply rotated to bring a sharp new cutting edge into position for milling when a previously-used cutting edge becomes dull. Other advantageous features of the pen milling device in accordance with the present disclosure will be discussed herein.

In one aspect, the present disclosure may provide for a pen milling device for milling pen blanks comprising: a cutter head having a body with a first end and a second end, a reamer extending longitudinally outwardly from the second end of the body, and a cutter detachably engageable with the body; wherein the cutter has at least one cutting edge that extends outwardly beyond the second end of the body. This exemplary embodiment or another exemplary embodiment may further provide for the cutter has a plurality of cutting edges. This exemplary embodiment or another exemplary embodiment may further provide for the cutter to be selectively rotated relative to the second end of the cutter head to present one of the plurality of cutting edges for use. This exemplary embodiment or another exemplary embodiment may further provide for the cutter head to further comprise: a coupling adapted to be engaged with a rotating apparatus, said coupling being integrally formed with the first end of the body and extending outwardly from the first end. This exemplary embodiment or another exemplary embodiment may further provide for the cutter to be made from a carbide material. This exemplary embodiment or another exemplary embodiment may further provide for the reamer to be detachably engageable with the cutter head. This exemplary embodiment or another exemplary embodiment may further provide for the reamer to comprise a first section of a first diameter and a second section of a second diameter wherein the second diameter is less than the first diameter, and wherein the cutter head defines a bore that is complementary to the second section. This exemplary embodiment or another exemplary embodiment may further comprise a collar, wherein the collar limits the longitudinal travel of the reamer into the cutter head wherein the collar is interposed between the first section and section. This exemplary embodiment or another exemplary embodiment may further provide for the cutter to be trapezoidal in shape. This exemplary embodiment or another exemplary embodiment may further provide for at least one flute provided at a first end of the reamer remote from the body.

In another aspect, the present disclosure may provide for a method of milling a pen blank comprising: providing a pen blank having a first end, a second end opposed to the first end, and an exterior surface extending between the first end and the second end, providing a pen milling device having a cutter head with a reamer extending outwardly therefrom, drilling a hole through the pen blank from the first end to the second end, inserting a pen tube into the hole, locating a first end of the pen tube a distance inwardly away from the first end of the pen blank, inserting the reamer into a bore of the pen tube through an opening in the second end of the pen blank, engaging the second end of the pen blank with a cutter provided on the cutter head, rotating the pen milling device, cutting the first end of the pen blank with the cutter, and removing all pen blank material from the first end of the pen blank to the first end of the pen tube with the cutter. This exemplary embodiment or another exemplary embodiment may further provide for the cutting of the first end further includes, contacting the first end of the pen blank with a first cutting edge on the cutter. This exemplary embodiment or another exemplary embodiment may further provide for at least partially disengaging the cutter from the pen milling device when the first cutting edge becomes dull, rotating the cutter relative to the cutter head, presenting a second cutting edge, and securing the cutter to the pen milling device. This exemplary embodiment or another exemplary embodiment may further provide for prior to inserting the pen tube, placing glue around a pen tube. This exemplary embodiment or another exemplary embodiment may further provide for after inserting the reamer, removing excess glue from the bore of the pen tube with the reamer. This exemplary embodiment or another exemplary embodiment may further provide for turning the pen blank on a lathe, contacting the exterior surface of the pen blank with a separate cutting tool, removing pen blank material from the exterior surface with the separate cutting tool, and forming a hollow cylindrical member. This exemplary embodiment or another exemplary embodiment may further provide for prior to milling, inserting a first section of the reamer into a bore defined within the cutter head, aligning a flat portion on the exterior surface of the reamer with a set screw aperture defined on the cutter head, inserting a set screw through the set screw aperture, rotating the set screw until the reamer is secured to the cutter head. This exemplary embodiment or another exemplary embodiment may further provide for disengaging the cutter, rotating the cutter to present a new cutter edge, and reengaging the cutter. This exemplary embodiment or another exemplary embodiment may further provide for disengaging the cutter, discarding the cutter, and installing a new cutter. This exemplary embodiment or another exemplary embodiment may further provide for contacting a collar on the reamer with the second end of a cutter head and limiting a depth of engagement of the reamer within the cutter head.

BRIEF DESCRIPTION OF THE SEVERAL VIEWS OF THE DRAWINGS

A sample embodiment of the disclosure is set forth in the following description, is shown in the drawings and is particularly and distinctly pointed out and set forth in the appended claims. The accompanying drawings, which are fully incorporated herein and constitute a part of the specification, illustrate various examples, methods, and other example embodiments of various aspects of the disclosure. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

FIG. 4 is a left side elevation view of the cutter head shown on its own.

FIG. 5 is bottom plan view of the cutter head.

FIG. 9 is a bottom plan view of the reamer.

FIG. 9a is a rear side elevation view of the reamer.

FIG. 10 is a cross-sectional view of the cutter head taken along line 10-10 on FIG. 2a.

FIG. 11 is a cross-sectional view of the cutter head taken along line 11-11 on FIG. 5.

FIG. 14a is a side elevation view of an alternative embodiment of a reamer.

FIG. 14b is a front end elevation of an alternative embodiment of a reamer.

FIG. 14c is a rear end elevation of an alternative embodiment of a reamer.

FIG. 15a is a front right perspective view of a pen blank with a hole drilled along its longitudinal center axis and showing a pen tube ready for insertion into the hole.

FIG. 15b is a front right perspective view of the pen blank with the pen tube partially inserted into the hole.

FIG. 15c is a front right perspective view of the pen black with the pen tube fully inserted into the hole and showing the end of the pen tube recessed a distance inwardly from the end of the pen blank.

FIG. 15d is a front right perspective view of the pen blank after milling and showing the end of the pen blank flush with the end of the pen tube and showing the removed region of the pen blank in phantom.

Similar numbers refer to similar parts throughout the drawings.

DETAILED DESCRIPTION

A new device and method of operation thereof is depicted in the present disclosure and throughout FIGS. 1-15E. Device 10 is a new and improved pen milling device that may be used to mill pen blanks and produce clean curved surfaces across the interior and clean flat surfaces across the exterior of a pen blank as will be discussed hereafter.

Figure 1:
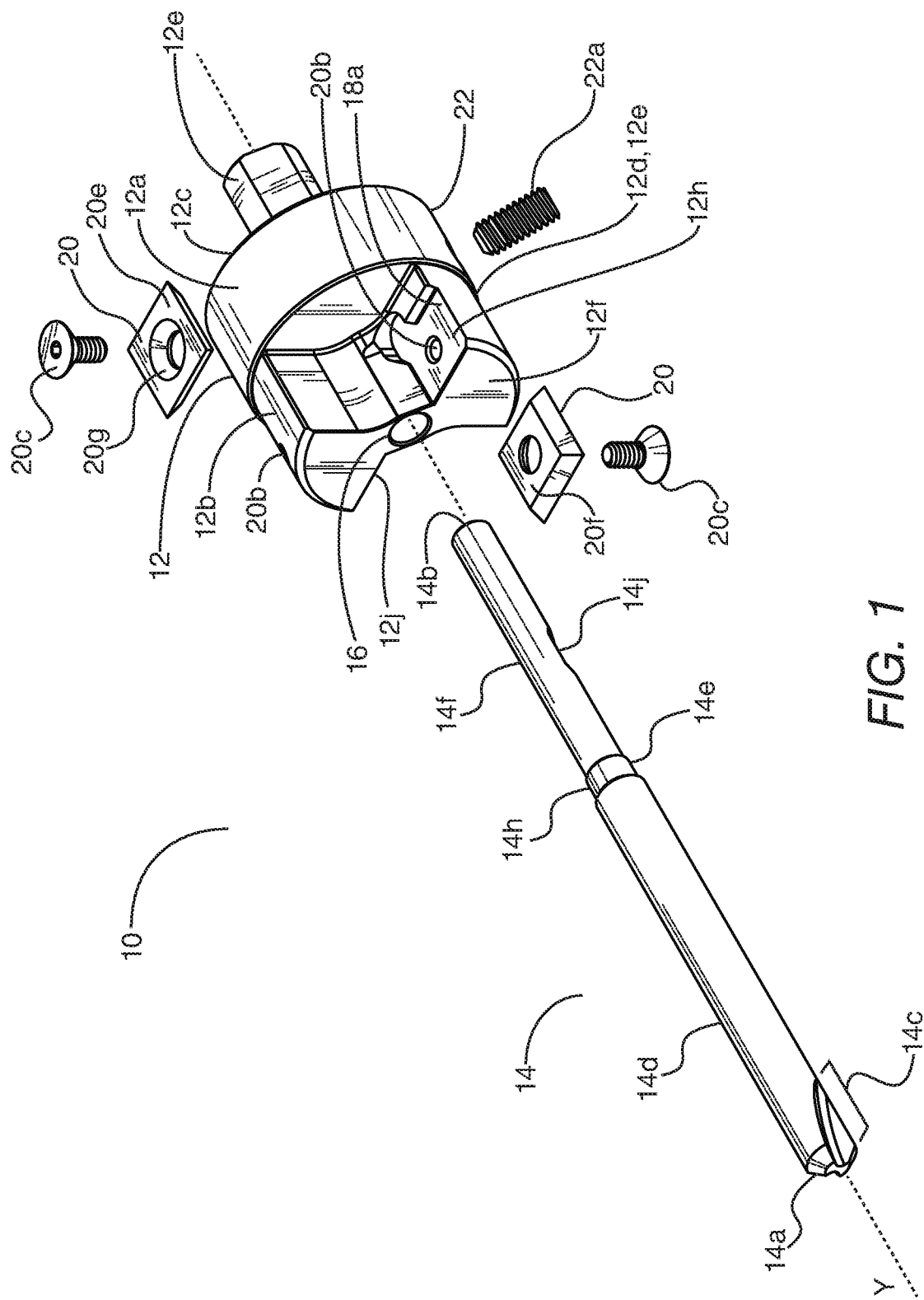
FIG. 1 is an exploded isometric prospective view of a pen milling device that includes a cutter head and a reamer in accordance with aspects of the present disclosure.

Referring to FIG. 1, an exploded view of device 10 is shown. The device 10 comprises two major components, a cutter head 12 and a reamer 14. Reamer 14 is selectively engageable with the cutter head 12. Cutter head 12 has a body with first portion 12a and a second portion 12b. The first portion 12a is generally cylindrical in shape and has a first end 12c and an opposed second end 12d. First portion 12a may be circular in transverse cross-section, i.e., at right angles to longitudinal axis "Y". The second portion 12b extends outwardly from second end 12d of first portion 12a. Second portion 12b has a first end 12e and a second end 12f. The first end 12e of second portion 12b is integrally formed with second end 12d of first portion 12a. Second end 12f of second portion 12b is a substantially flat surface that is oriented parallel to second end 12d of first portion 12a and is spaced a distance away therefrom. A longitudinal axis "Y" extends between first end 12c of first portion 12a and second end 12f of second portion 12b. Longitudinal axis "Y" is oriented at right angles with respect to the first end 12c and second end 12f of the body.

In accordance with an aspect of the present disclosure, the second portion 12b of cutter head 12 is not cylindrical in shape or circular in transverse cross-section. Instead, the second portion 12b defines two generally C-shaped cutout regions 12h, 12j that are opposed to each other as best seen in FIG. 3. The cutout regions 12h, 12j each occupy around one quarter of the circumference of the cylindrical first portion 12a and leave a back-to-back wedge-shaped second portion 12b therebetween as best seen in FIG. 3. This back-to-back wedge-shaped second portion 12b extends longitudinally outwardly from second end 12d of first portion 12a as shown in FIGS. 1 and 2.

Figure 7:
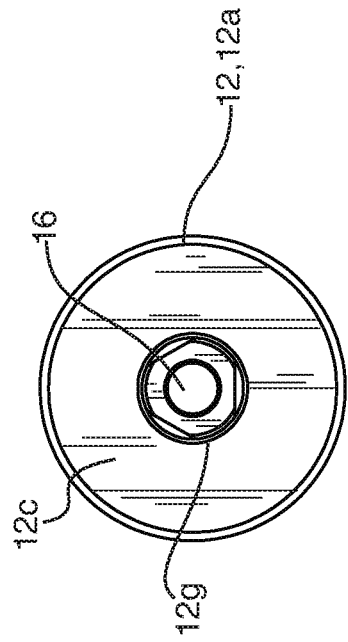
FIG. 7 is a rear end elevation view of the cutter head.
Figure 6:
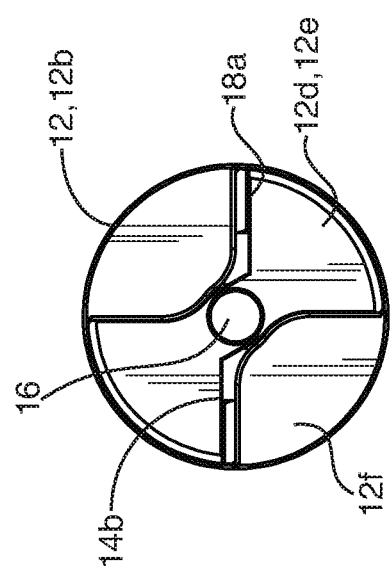
FIG. 6 is a front elevation view of the cutter head with the cutters removed therefrom.

A coupling 12g extends outwardly from the first end 12c of first portion 12a and along the longitudinal axis "Y". The coupling 12g is integrally formed with the first end 12c and the first portion 12a, second portion 12b, and coupling 12g together form a unitary monolithic component. The coupling 12e may be hexagonally shaped when the device 10 is view from the rear (FIG. 7). In another example, coupling 12g may have one or more straight sections and one or more arcuate sections that help orient the coupling 12g in a collet or chuck of a rotating apparatus. The coupling 12g is adapted to be utilized to engage device 10 with a rotating apparatus configured to rotate device 10. In one example, coupling 12g is engaged with a drill press. It will be understood that in other circumstances coupling 12g may be engaged with a different rotating apparatus such as a drill.

Cutter head 12 defines a bore 16 therein. The bore 16 originates in a first aperture in a rear end of the coupling 12g and extends inwardly and through the cutter head 12 along the longitudinal axis Y. A second aperture defined in the second end 12g of second portion 12b is in communication with the bore 16.

The exterior walls of second portion 12b that define cutout regions 12h, 12j include a first surface and a second surface that each define a depression 18a, 18b therein. The depressions 18a, 18b are shaped to receive a replaceable cutter 20 therein in accordance with the present disclosure. As illustrated, each cutter 20 is of a square shape and consequently each depression 18a, 18b is of a square shape. (It will be understood that if the cutter 20 was of a different shape, such as rectangular, for example, then the depressions 18a, 18b would be complementary in shape. There are two depressions 18a, 18b defined on the second portion 12b. An aperture 20b originates in a central region of the flat surface that defines part of depression 18a, 18b and continues through first portion 12a, terminating in an opening defined in the arcuate surface on the outside of second portion 12b, as is seen in FIGS. 4 and 5. The aperture 20b may be fully threaded or partially threaded in order to accommodate the length of the fastener 20c. Although a screw has been illustrated, any fastener that is used to secure to the cutter 20 to the cutter head 12 may be employed to engage the cutter 20 to the body of the cutter head 12.

The cutters 20 have a four distinct cutting edges on four sides 20d, 20d', 20d", and 20d'", respectfully, as well as a top surface 20e and a bottom surface 20f. The cutting edges 20d, 20d', 20d", 20d", are generally trapezoidal in shape where the long side of the trapezoid abuts the top surface 20e and the short side of the trapezoid abuts the bottom surface 20f. The edges 20d, 20d', 20d", 20d'" are oriented at an angle that goes from the top surface 20e to the bottom surface 20f, where the top surface 20e is further forward relative to the "Y" axis compared to the bottom surface 20f. As such, the edges 20d, 20d', 20d", 20d'" are so oriented that they each form a sharp cutting edge. As such, the cutters 20 are selectively rotatable to the second end 12d of the cutter head 12 to present one of the cutting edges 20d, 20d', 20d", 20d'" for use. Additionally, within the cutters 20 there is a countersunk hole 20g that goes from the top surface 20e to the bottom surface 20f. The countersunk hole 20g is operative to engage with a fastener 20c and allow the cutters to be secured to the cutter head 12. The cutters 20 are made of a carbide material in an exemplary embodiment.

The cutters 20 are operative to be secured to the cutter head via the fasteners 20c. The fasteners 20c are inserted into the apertures 20b, thereby allowing the cutters 20 to be in engagement with the cutter head 12. In the present embodiment the fasteners 20c may be a #4-40×¼" flat head cap screw.

The first portion 12a defines a set screw aperture 22 that originates in an opening in the circumferential exterior surface of first portion 12a and terminates in bore 16 (see FIG. 11). A set screw 22a is inserted through the set screw aperture 22 which is threaded and operative to engage an exterior surface of the reamer 14 and secure it in place as will be described later herein. In the present embodiment the set screw 22a is an ⅝₃₂"×⅜" flat point set screw.

Referring particularly to FIGS. 1, 8 to 9A, reamer 14 has a body with a first end 14a and second end 14b. The body is generally cylindrical along its length from first end 14a to second end 14b except in certain regions that will be discussed hereafter. When reamer 14 is engaged with cutter head 12, as will be discussed later herein, the first end 14a of the reamer 14 is disposed distally away from the cutter head 12. The second end 14b is engaged with the cutter head 12. At the first end 14a of the reamer 14, there is provided at least one drill flute 14c. The drill flute 14c is defined by the arcuate surface tip at a first end 14a that allows material drilled out to be properly removed from the surface. The drill flute 14c has a middle curved notch. The drill flute 14c has a radius of curvature of about 1.5 inches. It will be understood that a different radius of curvature may be used.

Figures 8, 8A:
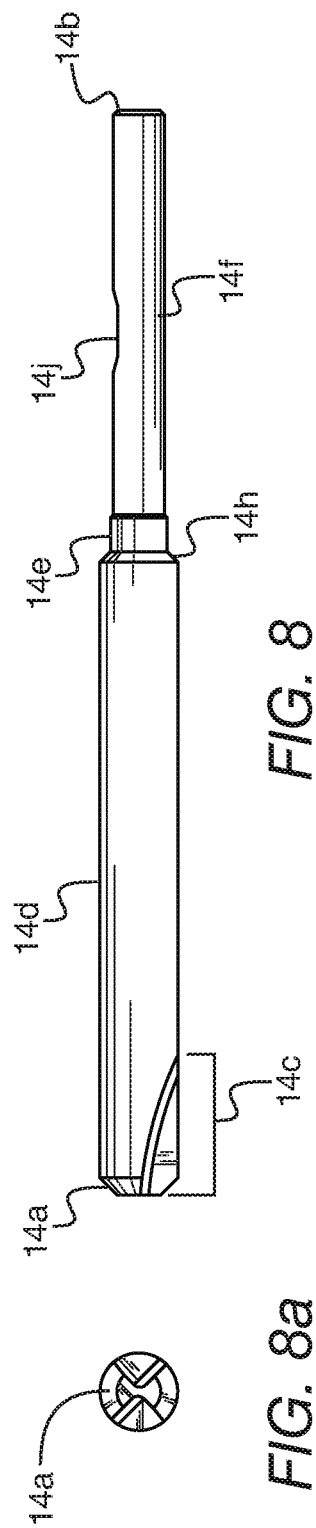
FIG. 8 is a right side elevation view of the reamer shown on its own.
FIG. 8a is a front end elevation view of the reamer.
Figure 12A:
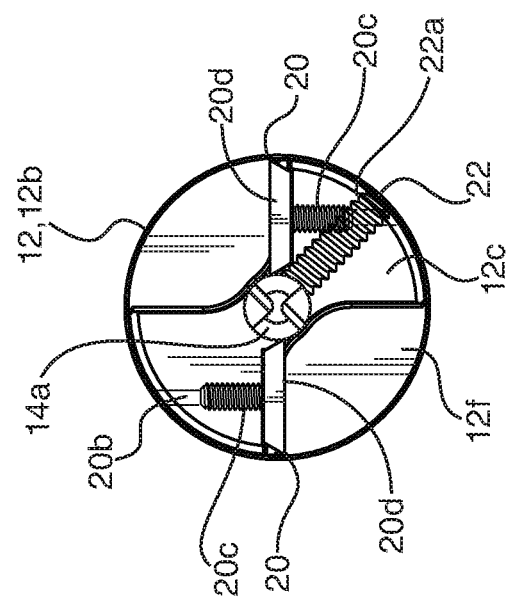
FIG. 12a is a partial cross-sectional view of the cutter head similar to FIG. 12 showing the set screw engaging the exterior surface of the reamer.
Figure 12:
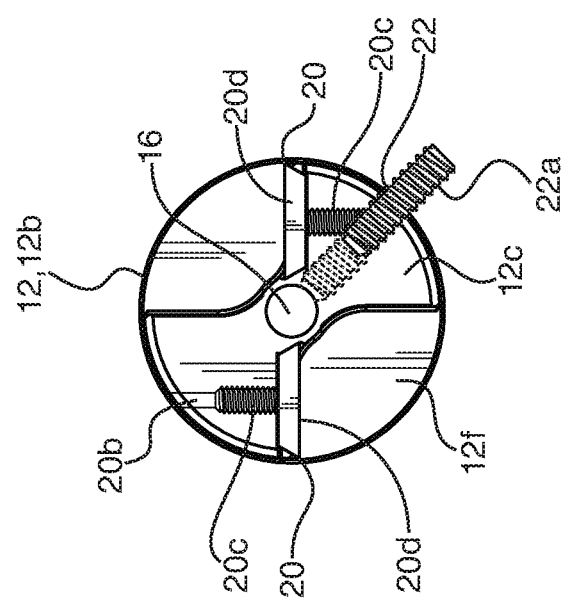
FIG. 12 is a partial cross-sectional view of the cutter head similar to FIG. 10 showing a set screw being inserted into an aperture defined in the cutter head.
Figure 13:
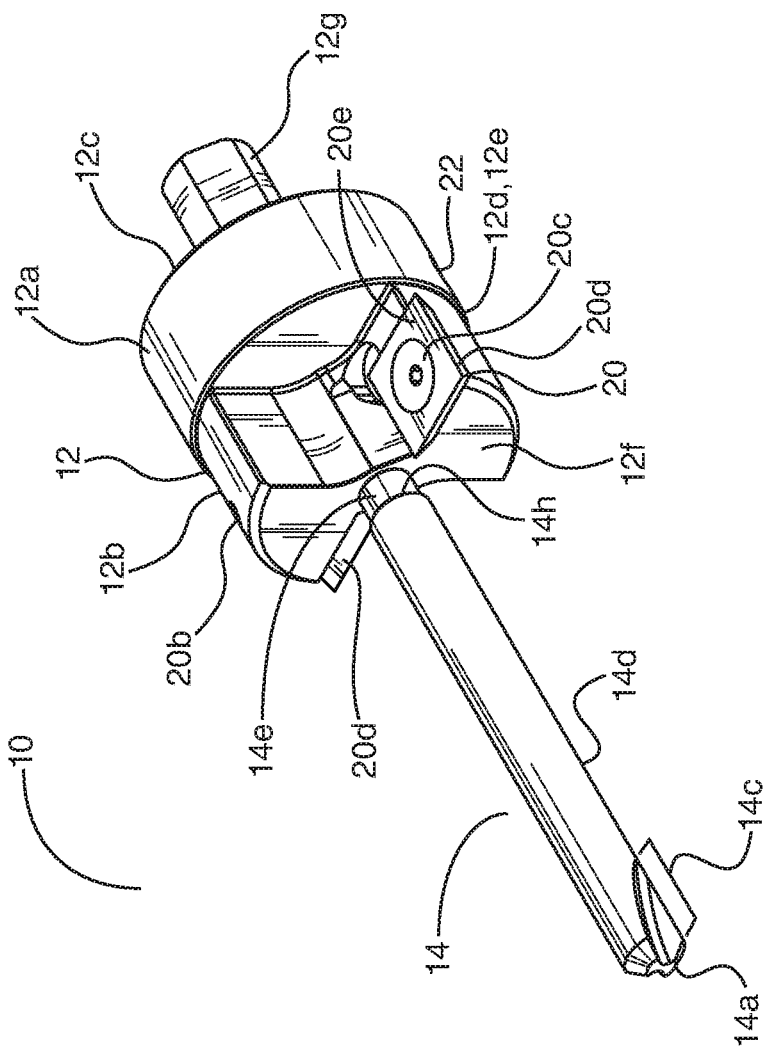
FIG. 13 is a front right perspective view of the assembled pen milling device in accordance with an aspect of the present disclosure.

Between the first end 14a and second end 14b, the body of reamer 14 forms a plurality of sections of different diameter. The first section 14d extends from the first end 14a to a collar 14e. Collar 14e is generally at a 45-degree angle to the longitudinal axis "Y". A second section 14f extends from the collar 14e until proximate the second end 14b. A chamfer may be provided on the second end 14b and is shown as the internal ring "T". Each section 14d, 14e, and 14f, is of a different diameter and therefore of a different circumference. First section 14d is of a first diameter "W" (FIG. 9A), collar 14e is of a second diameter "V", second section 14f is of a third diameter "U". The first diameter "W" is greater than the second diameter "V", which in turn is greater than the third diameter "U". As best seen in FIG. 8, a tapered portion 14h extends between collar 14e and first section 14d. The first diameter "W" which may include, but is not limited to 7 mm, 8.2 mm, 10 mm, 10.5 mm, 11 mm, 12.5 mm, ⅜", ¹⁵⁄₃₂" ²⁵⁄₆₄", ²⁷⁄₆₄", ³¹⁄₆₄", and ³³⁄₆₄".

An exemplary reamer 14 has a length from the first end 14a to the second end 14b of 4 inches. Further, the length of the first end 14a to the collar 14e is 2.37 inches. Additionally, the length of the collar in the exemplary embodiment is 0.14 inches. Also, the length of the second section is 14f is 1.49 inches.

Tapered portion 14h tapers in diameter from the first diameter "W" to the second diameter "V". The second diameter "V" is slightly smaller than the diameter of bore 16 defined in cutter head 12. As a consequence, second section 14f and collar 14e of reamer 14 are able to be inserted into bore 16 of cutter head 12. Because second diameter "V" approximates the diameter of bore 16, there will be a friction-fit between collar 14e and the surface of cutter head 12 that defines bore 16. As a result, the collar 14e is operative to limit the depth of engagement of the reamer 14 within the cutter head 12.

When the second end 14b of reamer is inserted into the bore 16, reamer 14 may be moved inwardly toward first end 12c of first portion 12a until the collar 14e, particularly the tapered portion 14h, makes contact with a beveled surface 12k that circumscribes the opening to bore 16 in second end 12f of cutter head 12. The collar 14e will prevent the reamer 14 from being moved further inwardly into the bore 16 and therefore acts as a stop.

It should be noted that the combined length of collar 14e and second section 14f, as illustrated, is less than the length of cutter head 12 from second end 12f to the end of coupling 12g. Consequently, second section 14f of reamer 14 does not extend outwardly beyond coupling 12g. (It will be understood that in other instances, second section 14f may extend partially outwardly from the opening to the bore 16 defined in the end of coupling 12g.)

Second section 14f of reamer 14 is substantially cylindrical in shape except for at least one portion that is substantially flat or planar. That flat portion is indicated by the reference number 14j (FIG. 9). When second section 14f is inserted into bore 16, flat portion 14j will be brought into alignment with set screw aperture 22. A set screw 22a is then inserted into set screw aperture 22 through an opening in the circumferential exterior surface of first portion 12a of cutter head 12 (FIGS. 5 and 11). Set screw 22a is rotated until a terminal end thereof contacts flat portion 14j on reamer 14. Continued rotation of set screw 22a will cause second section 14f of reamer to become locked within bore 16 of cutter head 12 to such an extent that reamer 14 cannot be accidentally disengaged from cutter head 12.

The reamer 14 provided may be any one of a plurality of different diameters. A skilled craftsman may select the most appropriate one of the plurality of diameter reamers for the desired use.

Figures 2A, 2B:
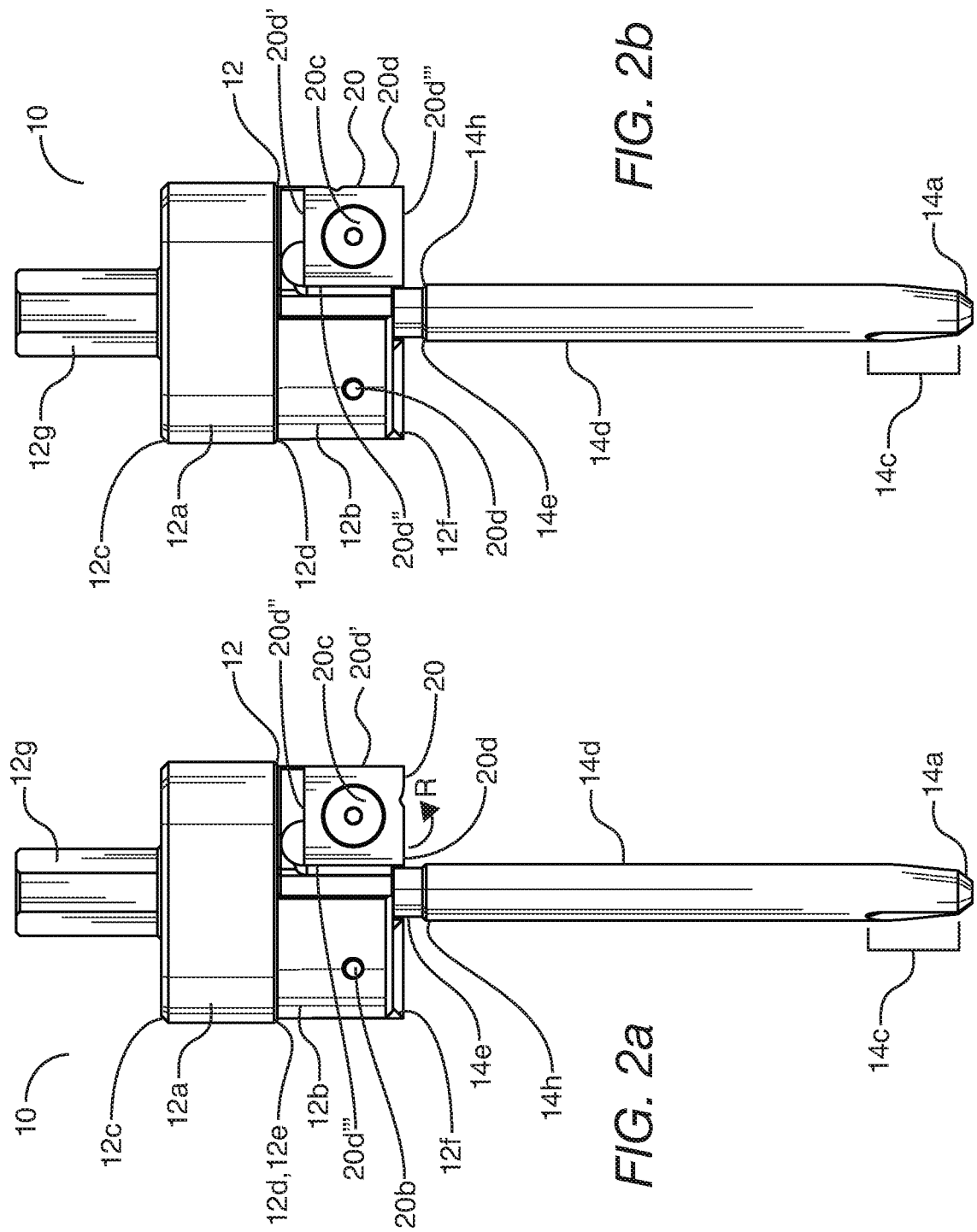
FIG. 2a is a top plan view of the pen milling device showing a worn cutter on the reamer.
FIG. 2b is a top plan view of the pen milling device with the cutter rotated to present a new sharp cutting edge.
Figure 3:
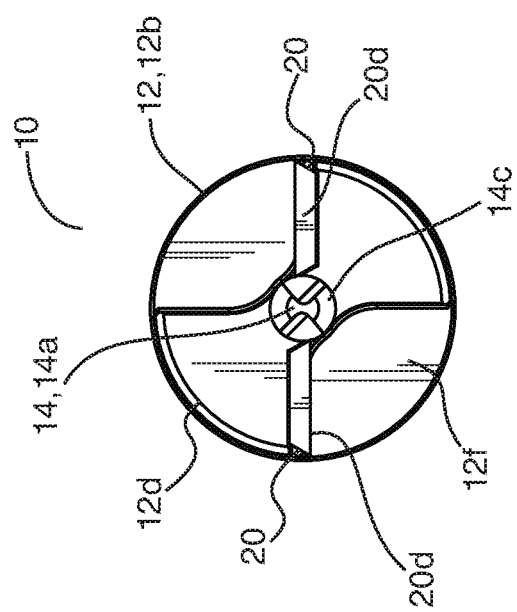
FIG. 3 is a front elevation view of the pen milling device.

FIG. 2a shows one of the cutters 20 oriented in such a way that a first cutting edge 20d thereof extends outwardly beyond second end 12g of second portion 12b and is therefore in a position to cut material from a pen blank. However, FIG. 2a also shows that cutting edge 20d has become worn and/or damaged. The other cutting edges 20d', 20d", 20d'" on cutter 20 remain sharp. When cutter head 12 is in this orientation, the cutter head 12 will not be as effective in removing material from a pen blank as when the presented cutting edge is sharp. The craftsman can address this problem by loosening fastener 20c to a sufficient degree to permit cutter 20 to be rotated about the shaft of the fastener 20c and to move one of the other cutting edges 20d', 20d", 20d'" into a position where that other sharp cutting edge extends beyond second end 12f. As such, the cutter 20 may be rotated in a first direction "R" as shown in FIG. 2a to a position where a sharp, non-worn surface, such as cutting edge 20d' is presented as the edge of the cutter 20 that extends beyond second end 12f as shown in FIG. 2b. If all cutting edges 20d, 20d', 20d", 20d'" are worn on cutter 20 of if cutter 20 for some other reason is inoperable, then fastener 20c may be completely removed. Cutter 20 can then be withdrawn from depression 18a or 18b and a replacement cutter can be placed in the depression 18a or 18b and secured in place with an associated fastener 20c.

Referring now to FIGS. 14a, 14b, and 14c, there is shown a side elevation view of a second embodiment of a reamer in accordance with an aspect of the present disclosure generally indicated at 114. Reamer 114 is substantially identical to reamer 14 except for a few features that are discussed hereafter. Reamer 114 differs from reamer 14 (shown alone in FIGS. 8-9A) in that the reamer 14 has a different shape before the collar 114*e* on a first end 114*a* and at a tapered region 114*h* as compared to the previous embodiment 14 at its collar 14*e* and at its tapered region 14*h*. The reamer has a substantially similar second end 114*b*, second portion 114*f*, collar 114*e*, and flat portion 114*j*. Additionally, the diameter "W" of the first end 114*a* and overall radius of the fluted portion 114*c* and the first section 114*d* differs from that of the previous embodiment. As such, the first diameter of the first embodiment 14 "W" differs from that of the first diameter "W" of the second embodiment 114.

FIG. 15A (FIG. 15A) shows a pen blank 24 having a body with a first end 24*a*, a second end 24*b*, a first side 24*c*, a second side 24*d*, a first face 24*e* and a second face 24*f*. The body of the pen blank 24 is generally a rectangular cube in shape. Pen blank 24 is of a first length measured from first end 24*a* to second end 24*b*. The longitudinal axis extends between the first face 24*e* and second face 24*f*. Pen blank 24 is illustrated as including a hole 24*g* that been drilled into the body along the longitudinal axis thereof. A pen tube 26 is illustrated as being positioned ready to be inserted into the hole 24*g*. Pen tube 26 has a first end 26*a* and a second end 26*b* and a bore 26*c* that extends from an opening in first end 26*a* to an opening in second end 26*b*. Bore 26*c* is aligned along a longitudinal axis of pen tube 26, where the longitudinal axis extends from first end 26*a* to second end 26*b*. Pen tube 26 is of a second length measured from first end 26*a* to second end 26*b* and the second length of pen tube 26 is shorter than the first length of pen blank 24.

FIG. 15B (FIG. 15B) shows the pen tube 26 partially inserted into the hole 24*g*. The exterior surface of pen tube 26 may be entirely or partially coated with an adhesive in order to secure the pen tube 26 to the pen blank 24. Either a first end 26*a* or a second end 26*b* of the pen tube 26 is inserted through an opening defined in the one of the ends 24*a* or 24*b* of the pen blank 24 and into the hole 24*g*.

Figure 15E:
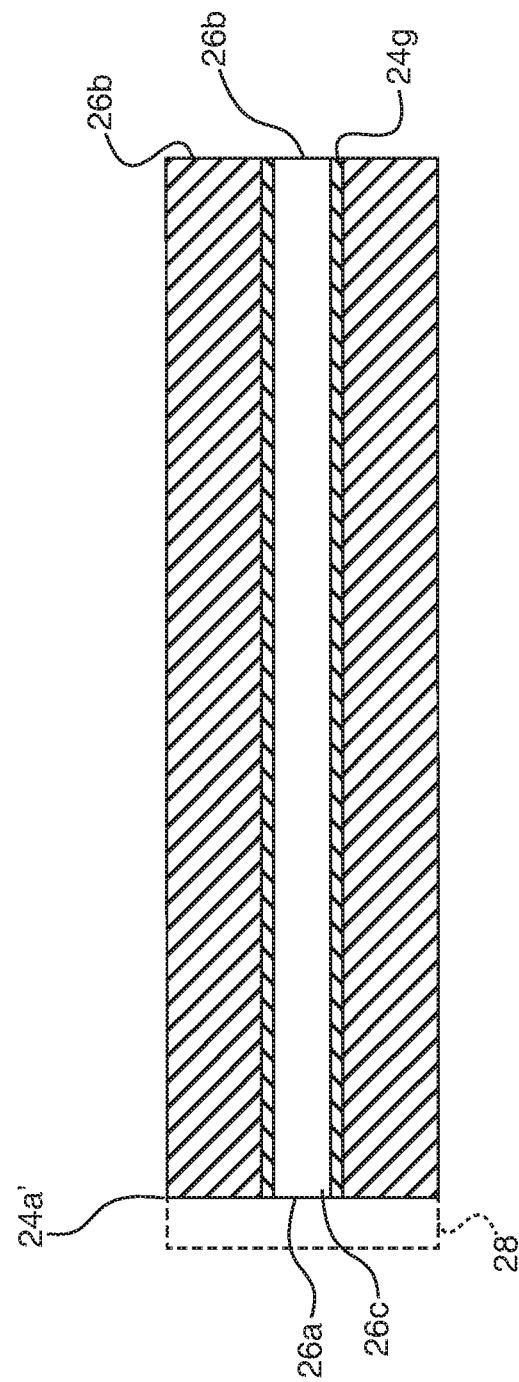
FIG. 15e is a longitudinal cross-sectional view of the pen blank shown in FIG. 15d.

FIG. 15C (FIG. 15C) shows the pen blank 24 with the pen tube 26 fully inserted into the hole 24*g* and showing the end 26*a* of the pen tube recessed a distance inwardly from the end 24*a* of the pen blank 24. The pen tube 26 is shorter in length than the length of the pen blank 24, so as when the pen tube 26 is entirely inserted into the pen blank 24, there is excess pen blank material extending beyond one or both of the first end 26*a* and second end 26*b* of pen tube 26. Pen milling device 10 is utilized to mill away this excess material 28 so that the milled first end 24*a*' of pen blank 24 is substantially flush with the first end 26*a* of pen tube 26. This milled excess material is shown in phantom in FIGS. 15D and 15E.

FIG. 15E (FIG. 15E) shows the pen tube 26 fully inserted to the pen blank 24 and the excess material 28 milled away to illustrate the milled first end 24' at the one end of the pen blank is illustrated in phantom. In this figure, no material has been milled from second end 24*b* of pen blank 24 because the second end 26*b* of pen tube 26 was already flush with second end 24*b* of pen blank 24. It will be understood, however, that if second end 26*b* of pen tube 26 is located a distance inwardly from second end 24*b* of pen blank 24, then excess material 28 will also be removed from the second end of the pen blank 24 until the second end 24*b* of the pen blank 24 and the second end 26*b* of pen tube 26 are flush.

Having now described the structure of the device and the various surfaces, components, and dimensions thereof, a method of using pen milling device 10 will now be described.

The second end 14*b* of the reamer 14 is inserted into the bore 16 of the cutter head 12. Then, the cutter head 12 is attached to the reamer 14 by inserting the set screw 22*a* through the set screw aperture 22 until the end thereof engages the flat portion 14*j*, and by doing so, the assembled device 10 is formed. The device 10 is then coupled to an external rotation device by the coupling 12*g*. The rotation device may be a drill press, drill, or other such device capable of rotating the cutter head 12 and thereby the reamer 14. The external rotation device is operative to rotate the assembled device 10.

The pen blank 24 to be worked on is secured in any suitable manner so that it will not rotate in unison with the pen milling device 10. A drill press, drill, or other similar device may be engaged to drill the hole 24*g* in the pen blank 24. After drilling hole 24*g*, the pen tube 26 is inserted into the hole 24*g* after the hole 24*g* is located. The exterior surface of the pen tube 26 may be partially or entirely coated with an adhesive prior to insertion. Since the pen tube 26 is shorter than the pen blank 24, excess pen blank material must be trimmed or milled down from one or both ends 24*a*, 24*b* of pen blank 24 so that the end(s) 24*a*, 24*b* of the pen blank 24 are flush with the ends 26*a*, 26*b* of the pen tube 26. The diameter of the reamer 14 at a first section 14*d* and consequently the size of the hole 24*g* in the pen blank 24 may be common sizes of pen blanks including but not limited to: 7 mm, 8.2 mm, 10 mm, 10.5 mm, 11 mm, 12.5 mm, 3/8", 15/32" 25/64", 27/64, 31/64", and 33/64".

The assembled device 10 is operative to rotate in either of a first direction and a second direction about the Y-axis. After engaging coupling 12*g* of cutter head 12 in the rotation device (not shown), pen milling device 10 is moved downwardly toward first end 24*a* of pen blank 24. First end 14*a* of reamer 14 is inserted into an opening to the pen blank hole 24*g* of pen blank 24 and subsequently into an opening to bore 26*c* of pen tube 26. The rotating apparatus is then activated to rotate pen milling device 10. As the rotating first end 14*a* of the reamer 14 makes its way downwardly through the bore 26*c*, the flute 14*c* at the first end 14*a* removes any excess dried adhesive within bore 26*c*. In a further embodiment, the pen blank 24 may be rotated by an external device while the assembled device 10 remains stationary.

As the reamer 14 rotates and plunges deeper into the bore 26*c* of pen tube 26, in a nearly contemporaneous manner, the cutters 20 extending outwardly beyond the flat second end 12*f* of cutter head 12 come into contact with the first end 24*a* of the pen blank 24 and the presented cutting edge 20*d* begin to cut away pen blank material therefrom. Continued downward rotational movement "of the pen milling device 10 is continued until the newly milled first end 24*a* of pen blank 24 is flush with the first end 26*a* of pen tube 26. The cutters 20 are operative to mill the first end 24*a* of pen blank 24 in such a way that no ring or halo of pen blank material is left behind so as to circumscribe the milled region. All of the pen blank material between first end 24*a* and newly milled first end 24*a*' is removed so that the newly milled first end 24*a*' is substantially flat and flush with first end 26*a* of pen tube 26.

If a cutting edge 20*d* or cutting surface on one or both cutters 20 is beginning to dull after use or if a cutting edge 20*d* or cutting surface is damaged, a user may rotate the affected cutter 20 by loosening the associated fastener 20*c* and rotating the cutter 20 in a direction, such as that indicated by arrow "R" in FIG. 2A, so as to cause a sharp and undamaged cutting edge or cutting surface to extend beyond second end 12*f*. The previously loosened fastener 20c is tightened once again and the pen milling device 10 is ready for use again. If all four of the cutting edges or cutting surfaces on the cutter 20 are dulled or damaged, the associated fastener 20c may be completely removed, a new cutter 20 may be positioned for engagement with cutter head 12 and the fastener 20c will be utilized to secure the new cutter 20 in position. In the present embodiment, cutters 20 are illustrated that have four cutting edges or surfaces oriented at 90° to each other. However, in other embodiments, cutters may be provided that have fewer than or more than four cutting edges or cutting surfaces depending on the shape of the cutter and the cutter head 12. If all cutting edges 20d, 20d', 20d", 20d''' have been exhausted, the cutter 20 may be disengaged from the cutter head 12, discarded and a new cutter 20 may be installed.

After the pen blank 24 is milled out and the pen tube 26 is installed and the pen blank is milled down 24', a craftsman may then turn the pen blank on a lathe. This may be done by contacting the exterior surface of the pen blank with a separate cutting tool thereby removing pen blank material from the exterior surface with the separate cutting tool and forming a hollow cylindrical member.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The articles "a" and "an," as used herein in the specification and in the claims, unless clearly indicated to the contrary, should be understood to mean "at least one." The phrase "and/or," as used herein in the specification and in the claims (if at all), should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc. As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "above", "behind", "in front of", and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal", "lateral", "transverse", "longitudinal", and the like are used herein for the purpose of explanation only unless specifically indicated otherwise.

Although the terms "first" and "second" may be used herein to describe various features/elements, these features/elements should not be limited by these terms, unless the context indicates otherwise. These terms may be used to distinguish one feature/element from another feature/element. Thus, a first feature/element discussed herein could be termed a second feature/element, and similarly, a second feature/element discussed herein could be termed a first feature/element without departing from the teachings of the present invention.

An embodiment is an implementation or example of the present disclosure. Reference in the specification to "an embodiment," "one embodiment," "some embodiments," "one particular embodiment," or "other embodiments," or the like, means that a particular feature, structure, or characteristic described in connection with the embodiments is included in at least some embodiments, but not necessarily all embodiments, of the invention. The various appearances "an embodiment," "one embodiment," "some embodiments," "one particular embodiment," or "other embodiments," or the like, are not necessarily all referring to the same embodiments.

If this specification states a component, feature, structure, or characteristic "may", "might", or "could" be included, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical range recited herein is intended to include all sub-ranges subsumed therein.

Additionally, any method of performing the present disclosure may occur in a sequence different than those described herein. Accordingly, no sequence of the method should be read as a limitation unless explicitly stated. It is recognizable that performing some of the steps of the method in a different order could achieve a similar result.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures.

In the foregoing description, certain terms have been used for brevity, clearness, and understanding. No unnecessary limitations are to be implied therefrom beyond the requirement of the prior art because such terms are used for descriptive purposes and are intended to be broadly construed.

Moreover, the description and illustration of various embodiments of the disclosure are examples and the disclosure is not limited to the exact details shown or described.

What is claimed:

1. A pen milling device for milling pen blanks comprising:
    a cutter head having a body with a first end and a second end and a set screw aperture extending therethrough adapted for milling an outer edge and inner sleeve of a pen blank;
    a coupling with an outer surface having one or more straight sections, said outer surface of the coupling adapted to be engaged with a rotating apparatus, said coupling being integrally formed with the first end of the body of the cutter head and extending outwardly from the first end;
    a reamer extending longitudinally outwardly from the second end of the body; wherein the reamer is removably secured to the cutter head; and wherein the reamer extends orthogonal to the set screw aperture, said reamer adapted to slightly engage the inner sleeve of the pen blank; and
    a cutter having a plurality of cutting edges and detachably engageable with the body by a fastener between a first position and a second position, wherein the fastener is loosened from the body while still being engaged with the body for allowing rotation of the cutter about said fastener in the first position, and wherein the fastener is disengaged from the body for completely removing the cutter from the body in the second position; wherein the cutter has at least one cutting edge that extends outwardly beyond the second end of the body;
    wherein each cutting edge of the plurality of cutting edges is oriented orthogonally to one another;
    wherein the cutter is selectively rotated relative to the second end of the cutter head to present one of the plurality of cutting edges for use.

2. The pen milling device of claim 1, wherein the cutter is made from a carbide material.

3. The pen milling device of claim 1, wherein the reamer is detachably engageable with the cutter head.

4. The pen milling device of claim 3, wherein the reamer comprises a first section of a first diameter and a second section of a second diameter wherein the second diameter is less than the first diameter, and wherein the cutter head defines a bore that is complementary to the second section.

5. The pen milling device of claim 4, further comprising a collar, wherein the collar limits the longitudinal travel of the reamer into the cutter head wherein the collar is interposed between the first section and the second section.

6. The pen milling device of claim 1, wherein the reamer at a first section has a diameter of: 7 mm, 8.2 mm, 10 mm, 10.5 mm, 11 mm, 12.5 mm, 3/8", 15/32", 25/64", 27/64", 31/64", or 33/64".

7. The pen milling device of claim 1, further comprising:
at least one flute provided at a first end of the reamer remote from the body.

8. A method of milling a pen blank comprising:
providing a pen blank having a first end, a second end opposed to the first end, and an exterior surface extending between the first end and the second end;
providing a pen milling device having a cutter head with a reamer extending outwardly therefrom;
drilling a hole through the pen blank from the first end to the second end;
inserting a pen tube into the hole;
attaching a rotating device to one or more straight sections on an outer surface of a coupling integrally formed with a first end of a body of the cutter head and extending outwardly from the first end;
inserting the reamer into a bore of the pen tube through an opening in the second end of the pen blank;
engaging the second end of the pen blank with one cutting edge of a plurality of cutting edges of a cutter provided on the cutter head, wherein each cutting edge of the plurality of cutting edges is oriented orthogonally to one another;
rotating one of the pen milling device or the pen blank;
cutting the first end of the pen blank with the cutter; and
removing all pen blank material from the first end of the pen blank to the first end of the pen tube with the cutter.

9. The method of claim 8, wherein the cutting of the first end includes; contacting the first end of the pen blank with a first cutting edge on the cutter.

10. The method of claim 9, further comprising:
at least partially disengaging the cutter from the pen milling device when the first cutting edge becomes dull;
rotating the cutter relative to the cutter head;
presenting a second cutting edge; and
securing the cutter to the pen milling device.

11. The method of claim 8, further comprising:
prior to inserting the pen tube, placing glue around a pen tube.

12. The method of claim 11 further comprising:
after inserting the reamer, removing excess glue from the bore of the pen tube with the reamer.

13. The method of claim 8, and further comprising,
turning the pen blank on a lathe;
contacting the exterior surface of the pen blank with a separate cutting tool;
removing pen blank material from the exterior surface with the separate cutting tool; and
forming a hollow cylindrical member.

14. The method of claim 8, and further comprising: prior to milling,
inserting a first section of the reamer into a bore defined within the cutter head;
aligning a flat portion on the exterior surface of the reamer with a set screw aperture defined on the cutter head;
inserting a set screw through the set screw aperture; and
rotating the set screw until the reamer is secured to the cutter head.

15. The method of claim 8, further comprising,
disengaging the cutter;
rotating the cutter to present a new cutter edge; and
reengaging the cutter.

16. The method of claim 8, further comprising,
disengaging the cutter;
discarding the cutter; and
installing a new cutter.

17. The method of claim 8, wherein the inserting further comprises:
contacting a collar on the reamer with the second end of a cutter head and
limiting a depth of engagement of the reamer within the cutter head.

* * * * *